United States Patent
Codilian et al.

(10) Patent No.: US 7,064,918 B1
(45) Date of Patent: Jun. 20, 2006

(54) REDUCING HEAD GAIN CALIBRATION TIME IN A DISK DRIVE

(75) Inventors: Raffi Codilian, Irvine, CA (US); David D. Nguyen, Fountain Valley, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 94 days.

(21) Appl. No.: 10/698,273

(22) Filed: Oct. 31, 2003

(51) Int. Cl.
*G11B 21/02* (2006.01)
(52) U.S. Cl. .................................................. 360/75
(58) Field of Classification Search .................. None
See application file for complete search history.

(56) References Cited

U.S. PATENT DOCUMENTS

| | | | |
|---|---|---|---|
| 4,578,723 A | | 3/1986 | Betts et al. |
| 4,979,055 A | * | 12/1990 | Squires et al. ............ 360/69 |
| 6,108,151 A | * | 8/2000 | Tuttle et al. ............ 360/51 |
| 6,587,300 B1 | * | 7/2003 | Dobbek ................ 360/75 |

* cited by examiner

Primary Examiner—K. Wong
(74) Attorney, Agent, or Firm—Jonathan E. Prejean, Esq.

(57) ABSTRACT

A method for reducing a servo channel head gain calibration time comprising initiating a servo channel head gain calibration process for a head corresponding to the selected disk surface; obtaining a head gain calibration value for a pre-selected zone in the selected disk surface; comparing the obtained calibration value with a pre-stored calibration value for the pre-selected zone and generating a comparison result; and stopping the calibration process for the head if the comparison result does not exceed a threshold value.

11 Claims, 4 Drawing Sheets

REDUCING HEAD GAIN CALIBRATION TIME IN A DISK DRIVE

FIELD OF THE INVENTION

This invention relates to head gain calibrations in disk drives. More particularly, the present invention is directed to reducing servo channel head gain calibration times in a disk drive.

BACKGROUND OF THE INVENTION

Disk drives are commonly used to store large amounts of data in a readily available form. Typically, the primary components of a disk drive are a head disk assembly and a printed circuit board assembly which, when fixed to one another, form a functional unit that is then connected to a computer. The head disk assembly includes a head, and at least one data storage disk mounted on a spindle motor for rotating the storage disk near the head so that read/write operations may be performed on the disk.

Conventionally, disk surfaces are partitioned into logical zones for optimizing storage capacity by varying bit density within each of the logical zones. The zones may be visualized as concentric bands of tracks with a varying progression of bit density from band to band. In addition, disk surfaces are further partitioned via a series of angularly-spaced embedded servo-wedges disposed on the disk surfaces between data-wedges which contain data tracks with data sectors recorded in the intervals between servo-wedges on each track. Typically, servo-wedges are sampled at regular intervals by a read/write channel, and are processed by a servo controller to provide position information to a microprocessor for positioning a head over a desired track.

In order to reliably process the servo-wedge information in a given zone, the head gain associated with the zone is calibrated during disk drive manufacturing and stored in non-volatile memory such as reserved cylinders on the disk. Conventionally, the disk drive control system will retrieve the calibrated head gain along with other calibrated settings and the head gain for each zone is checked against the calibrated values during each initialization of the disk drive. An Automatic Gain Control (AGC) field is provided in each servo wedge which is read by the head and based on which the control system adjusts the head gain prior to reading data. In order to expedite the head gain adjustments at each servo-wedge, the pre-stored initial servo channel gain value is often used to reduce the time required for an auto ranging amplifier in the control system read channel to settle on an optimized gain.

Unfortunately, checking the head gain calibration for each zone and each head in a disk drive delays the time required for disk drive initialization. A typical disk drive currently may have 20 or more logical zones on each surface, while system manufacturers are demanding shortened initialization periods for the disk drive to provide a faster boot-up for the user. It is necessary to check the heads because over time, a phenomenon known as "head degradation" may occur which causes the head to operate at a significantly changed gain level.

Accordingly, what is needed is a method to reduce the time associated with the head gain calibration while monitoring for degradation of the head values over time.

SUMMARY OF THE INVENTION

This invention can be regarded as a method for reducing a servo channel head gain calibration time during the disk drive initialization in a disk drive comprising at least one head and at least one disk having at least one disk surface, each surface having a plurality of concentric zones. The method includes selecting a first disk surface; initiating a first servo channel head gain calibration process for a first head corresponding to the selected first disk surface; obtaining a first head gain calibration value for a pre-selected zone in the selected first disk surface; comparing the obtained first calibration value with a first pre-stored calibration value for the pre-selected zone and generating a first comparison result; and stopping the first calibration process for the first head if the first comparison result does not exceed a threshold value.

DETAILED DESCRIPTION OF THE INVENTION

Figure 1:
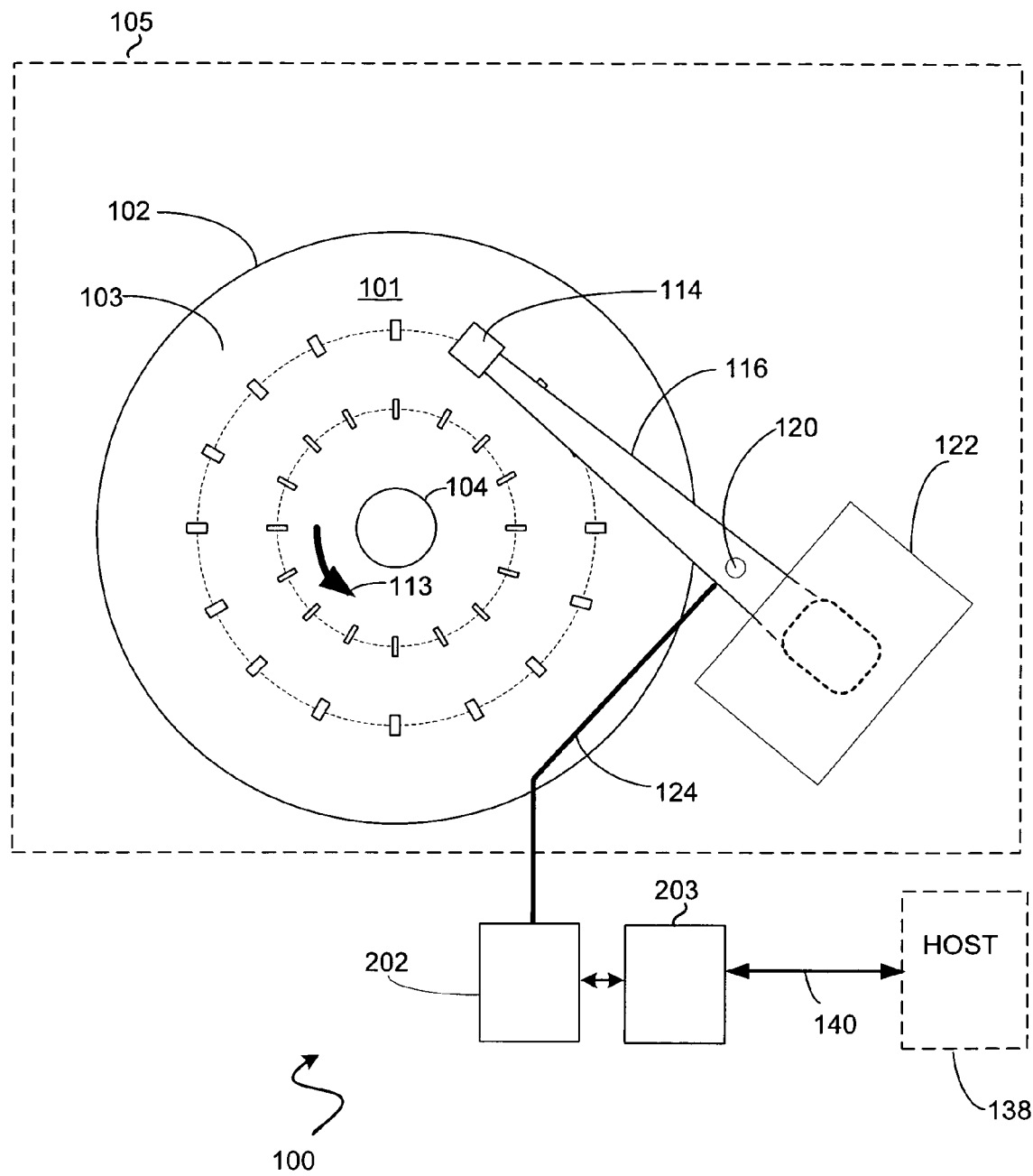
FIG. 1 illustrates an exemplary hard disk drive in which the present invention may be practiced.

With reference to FIG. 1, an exemplary hard disk drive 100 in which the present invention may be practiced is shown. As shown, the hard disk drive 100 includes a head disk assembly (HDA) 105 having one or more disks 102 with a magnetic media 101 formed on each surface 103 of a disk 102. The HDA 105 further comprises a transducer head 114 mounted on a rotary actuator 116 that rotates about a pivot 120 via controlled torques applied by a voice coil motor 122. While the disk drive 100 is in operation, the disk 102 rotates in an exemplary direction 113 about the axis of the spindle 104 at a substantially fixed angular speed such that the surface 103 of the disk 102 moves relative to the head 114.

As shown in FIG. 1, a signal bus 124, such as a flex cable, interconnects the HDA 105 to a servo-control system 202 which can control the movement of the actuator 116 in a manner well known in the art. In addition, the servo-control system 202 receives servo-signals from the head 114 during read and write operations performed on the disk 102. As also shown in FIG. 1, the servo-control system 202 is interconnected to the interface control system 203 which is in turn interconnected to a host computer 138 by a bus 140 for transferring of data between the hard disk drive 100 and the host 138.

Figure 2:
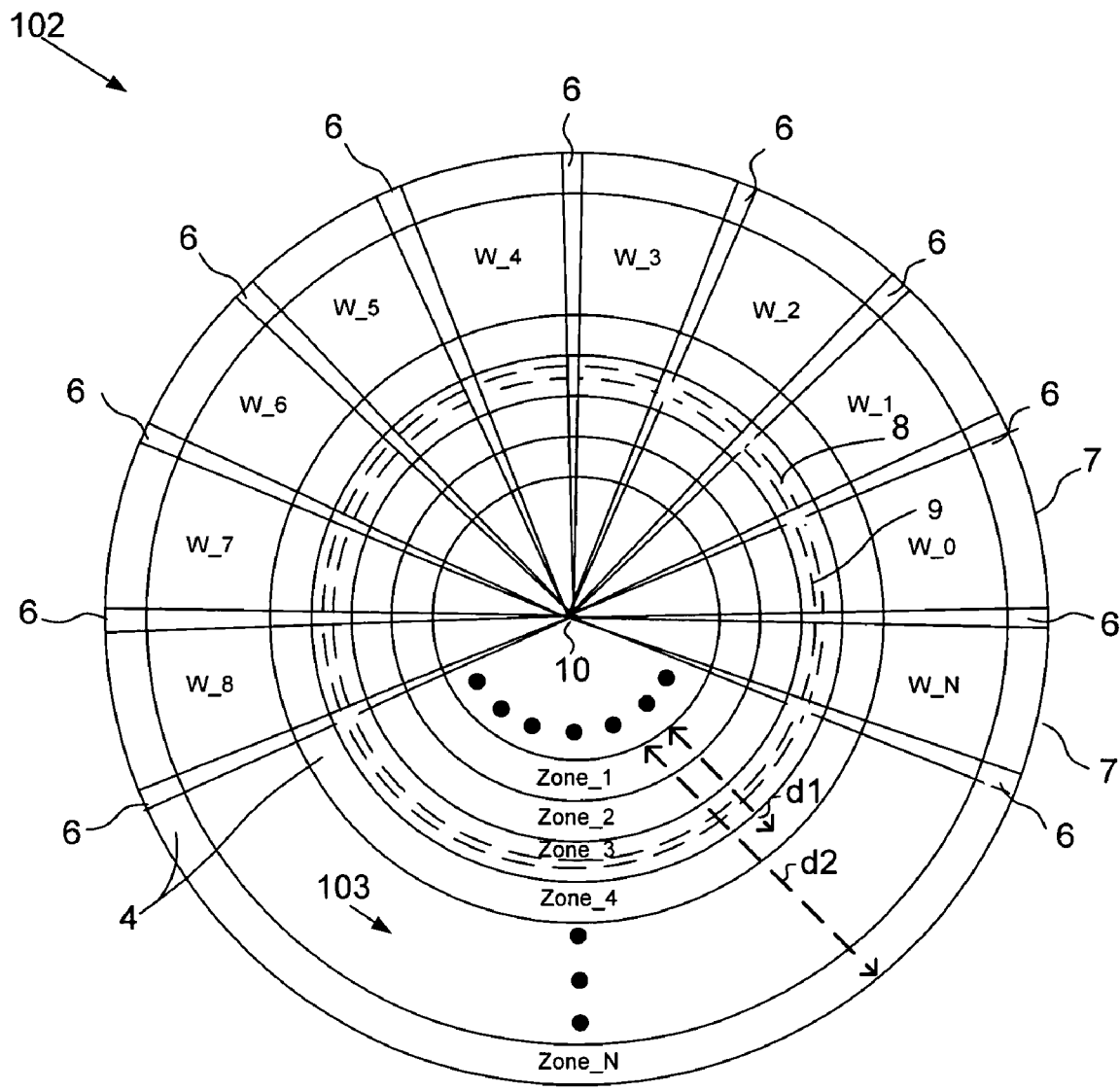
FIG. 2 illustrates a disk formatted for use with a disk drive employing an embodiment of the present invention.

FIG. 2 illustrates a disk 102 formatted for use with the disk drive 100 shown in FIG. 1. The disk 102 has a surface 103 that is partitioned into concentric zones 4, such as zone_1 through zone_N, each of which have a number of data tracks 8. The concentric zones 4 are used for optimizing storage capacity by varying bit density within each of the zones 4. As also shown, the surface 103 is further partitioned into a series of angularly-spaced embedded servo-wedges 6, disposed on the disk surfaces 103 between data-wedges 7, such as W_0 through W_N, which contain data tracks 8 with data sectors 9 recorded in the intervals between servo-wedges 6 on each track 8. The servo-wedges 6 are used in positioning and maintaining the head 114 over a desired track 8 during write and read operations.

Figure 3:
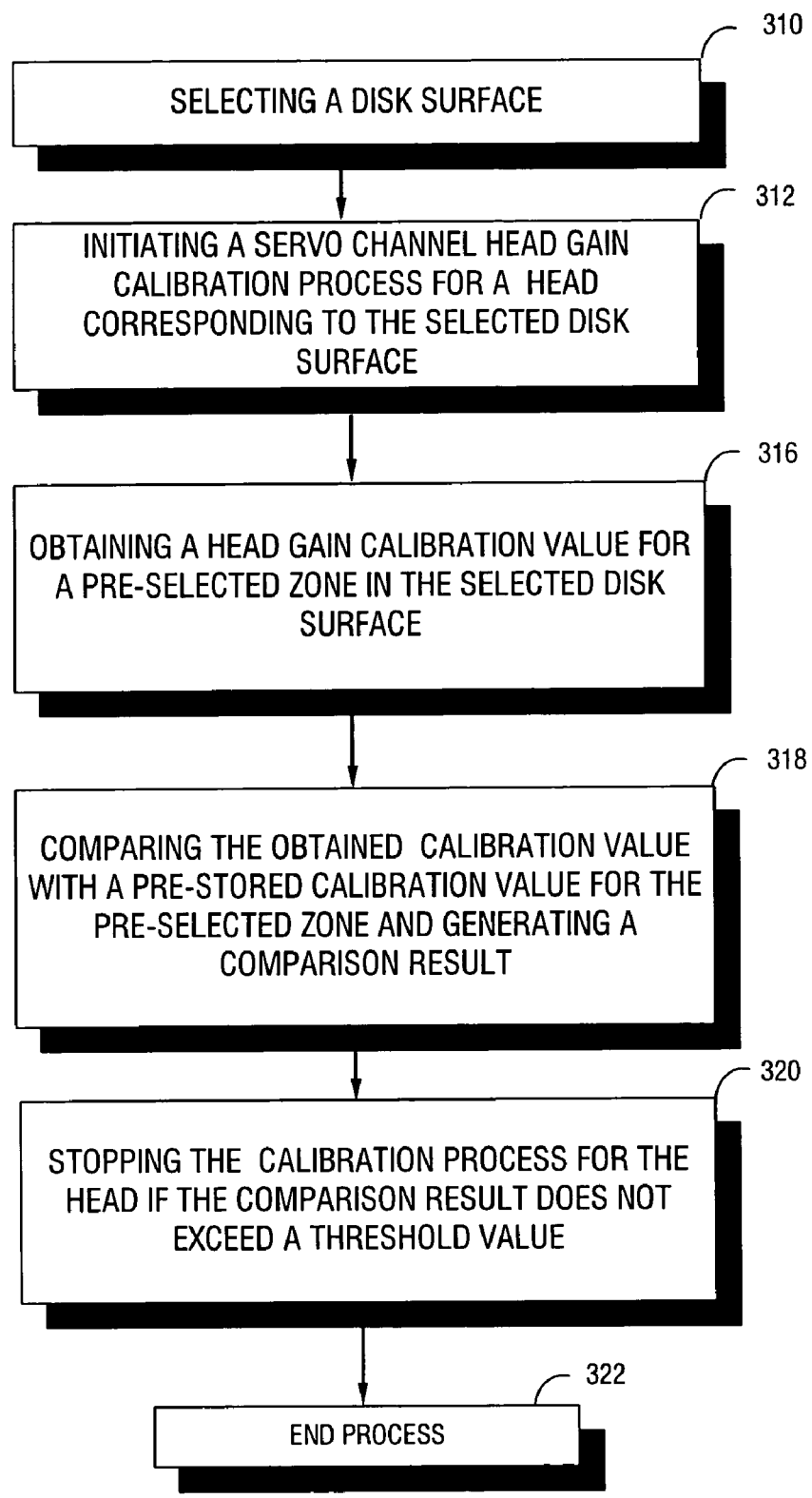
FIG. 3 is a flow chart illustrating a process used in an embodiment of the invention shown in FIG. 2.

FIG. 3 in conjunction with FIG. 2, illustrates a process used in an embodiment of the invention for reducing a servo channel head gain calibration time during the disk drive initialization. As shown, the process begins in block 310 in which a disk surface, such as disk surface 103 is selected. Next, in block 312, a servo channel head gain calibration process is initiated for a head corresponding to the selected disk surface, such as head 114 for disk surface 103 in FIG. 2.

Next, in block 316, a head gain calibration value is obtained for a pre-selected zone 4 in the selected disk surface 103. In one embodiment, the pre-selected zone is located closest to the center 10 of the disk surface 103, such as zone_1 in FIG. 2. In another embodiment, the pre-selected zone is located farthest from the center 10 of the disk surface 103, such as zone_N. In yet another embodiment, the pre-selected zone is at a median radial location between a zone 4 located closest to the center 10 of the disk surface 103 and a zone 4 located farthest from the center 10 of the disk surface 103. Fro this embodiment, as shown in FIG. 2, the pre-selected zone is zone_4 located at a distance d1 which is a median of distance d2 signifying the distance between zone_1 located closest to, and zone_N located farthest from, the center 10 of the disk surface 103. Suitably, the head gain calibration value for a pre-selected zone may be obtained using apparatus such as described in U.S. Pat. No. 4,578,723 entitled "HEAD POSITIONING SYSTEM WITH AUTOMATIC GAIN CONTROL" herein incorporated by reference, or by means of other apparatus and methods well known to those skilled in the art.

Next, in block 318, the obtained calibration value is compared with a pre-stored calibration value for the pre-selected zone and a comparison result is generated. Suitably, the pre-stored calibration value for the pre-selected zone, such as zone_4, is obtained from a pre-stored calibration value table, such as one generated subsequent to the disk drive assembly as described in the above provided reference.

Next, in block 320, if the comparison result does not exceed a threshold value, the calibration process for the head 114 is stopped. The threshold value corresponds to a pre-selected deviation of the head gain calibration value from the pre-stored calibration value, such as deviations associated with the degradation of the head 114 over time. Suitably, the pre-selected deviation is a ten percent deviation of the head gain calibration value from the pre-stored calibration value. The flow then proceeds to block 322 in which the overall process ends.

One advantage of the foregoing feature of the present invention over the prior art is that by stopping the calibration process if the comparison result does not exceed a threshold value the overall time associated with the head gain calibration is reduced (such as for example by a factor of 20 to 1 for a disk surface having 20 zones) while also monitoring for the degradation of the head values over time.

Figure 4:
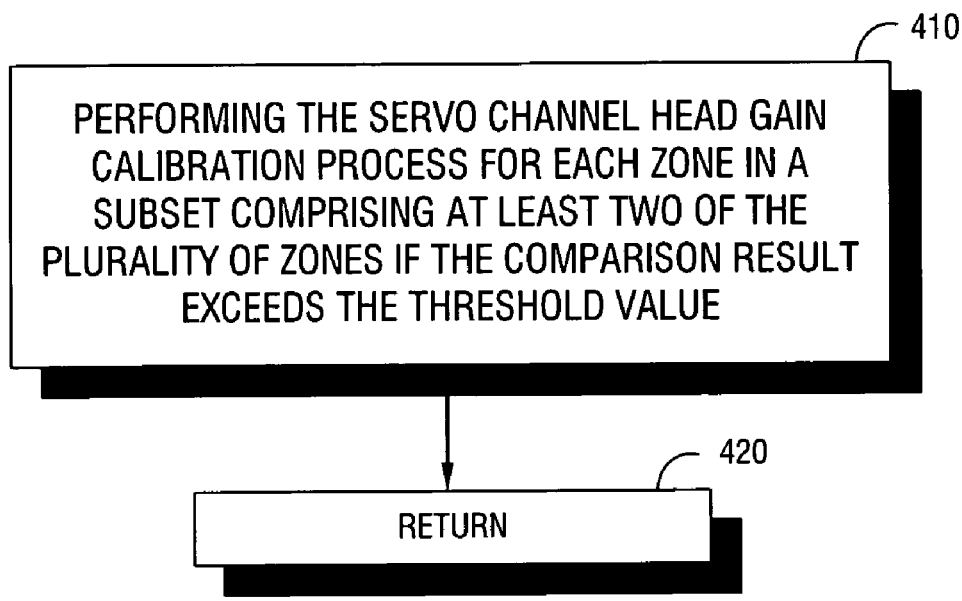
FIG. 4 is a flow chart illustrating a process used in conjunction with the process shown in FIG. 3.

FIG. 4 is further illustrates the process used in block 320 of FIG. 3. The process begins in block 410 in which the servo channel head gain calibration process is performed for each zone 4, or for each zone 4 in a subset comprising at least two of the plurality of zones 4 (such as for example for zone 4 in a subset comprising zone_2, zone_3 and zone_4) on the disk surface 103 if the comparison result exceeds the threshold value. The flow then proceeds to block 420 for returning to block 320 of FIG. 3.

Figure 5:
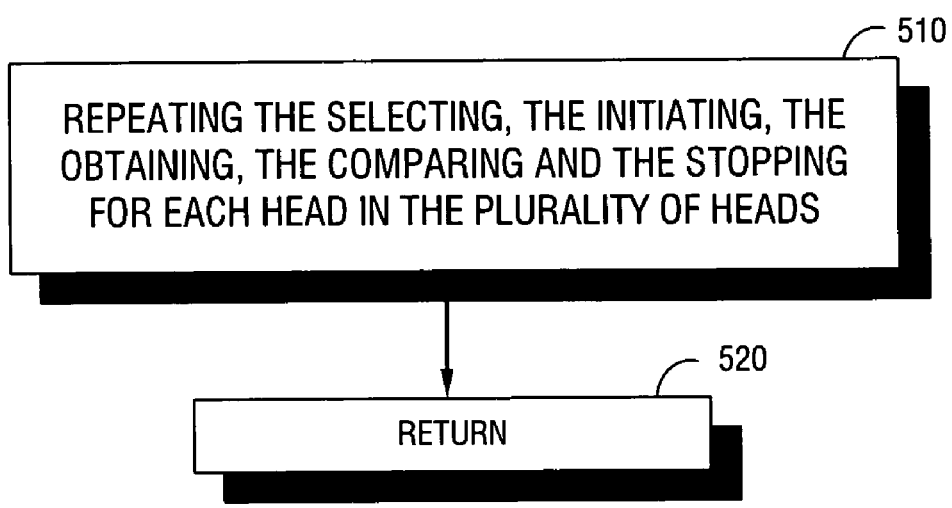
FIG. 5 is a flow chart illustrating another process used in conjunction with the process shown in FIG. 3.

FIG. 5 is another flow chart illustrating a process used in conjunction with the process shown in FIG. 3 for an embodiment of the present invention in which the disk drive 100 comprises a plurality of heads 114 facing a plurality of disks 102 each having at least one disk surface 103. The process begins in block 510 wherein the above described FIG. 3 process of selecting (block 310), initiating (block 312), obtaining (block 316), comparing (block 318) and stopping (block 320) is repeated for each head 114 and disk surface 103 in the disk drive 100. The flow then proceeds to block 520 for returning to block 322 of FIG. 3 wherein the overall process ends.

It should be noted that the various features of the foregoing embodiments were discussed separately for clarity of description only and they can be incorporated in whole or in part into a single embodiment of the invention having all or some of these features.

What is claimed is:

1. In a disk drive comprising at least one head and at least one disk having at least one disk surface, each surface having a plurality of concentric zones, a method for reducing a servo channel head gain calibration time during the disk drive initialization, the method comprising:
   selecting a first disk surface;
   initiating a first servo channel head gain calibration process for a first head corresponding to the selected first disk surface;
   obtaining a first head gain calibration value for a pre-selected zone in the selected first disk surface;
   comparing the obtained first calibration value with a first pre-stored calibration value for the preselected zone and generating a first comparison result; and
   stopping the first calibration process for the first head if the first comparison result does not exceed a threshold value.

2. The method of claim 1, wherein the first pre-stored calibration value is obtained from a first pre-stored calibration value table.

3. The method of claim 1, wherein the first pre-selected zone is at a median radial location between a first zone in the plurality of concentric zones located closest to a center of the disk surface and a second zone in the plurality of concentric zones located farthest from the center of the disk surface.

4. The method of claim 1, wherein the first pre-selected zone is a zone in the plurality of concentric zones located closest to a center of the disk surface.

5. The method of claim 1, wherein the first pre-selected zone is a zone in the plurality of concentric zones located farthest from a center of the disk surface.

6. The method of claim 1, further comprising: performing the first servo channel head gain calibration process for each zone in the plurality of zones if the first comparison result exceeds the threshold value.

7. The method of claim 1, further comprising:
   performing the first servo channel head gain calibration process for a subset comprising at least two of the plurality of zones if the first comparison result exceeds the threshold value.

8. The method of claim 1 wherein the threshold value corresponds to a preselected deviation of the first head gain calibration value from the first pre-stored calibration value.

9. The method of claim 8, wherein the preselected deviation is a ten percent deviation of the first head gain calibration value from the first pre-stored calibration value.

10. The method of claim 1, wherein the disk drive comprises a plurality of heads and a plurality of disks each having at least one disk surface, wherein the method further comprises:

selecting a second disk surface;

initiating a second servo channel head: gain calibration process for a second head corresponding to the selected second disk surface;

obtaining a second head gain calibration value for a preselected zone in the selected second disk surface;

comparing the obtained second calibration value with a second pre-stored calibration value for the pre-selected zone and generating a second comparison result; and stopping the second calibration process for the second head if the second comparison result does not exceed the threshold value.

11. The method of claim 10, further comprising: repeating the selecting, the initiating, the obtaining, the comparing and the stopping for each head in the plurality of heads.

* * * * *